(12) United States Patent
Stausberg et al.

(10) Patent No.: US 8,038,877 B2
(45) Date of Patent: Oct. 18, 2011

(54) OIL FILTER APPARATUS

(75) Inventors: Wolfgang Stausberg, Morsbach (DE); Michael Dedering, Morsbach-Lichtenberg (DE)

(73) Assignee: IBS Filtran Kunststoff-/Metallerzeugnisse GmbH, Morsbach (DE)

( * ) Notice: Subject to any disclaimer, the term of this patent is extended or adjusted under 35 U.S.C. 154(b) by 490 days.

(21) Appl. No.: 11/819,395

(22) Filed: Jun. 27, 2007

(65) Prior Publication Data

US 2008/0290013 A1    Nov. 27, 2008

(30) Foreign Application Priority Data

May 22, 2007   (DE) .......................... 10 2007 023 641

(51) Int. Cl.
*B01D 29/56*   (2006.01)
*B01D 35/027*   (2006.01)

(52) U.S. Cl. ................. 210/167.08; 210/433.1; 210/434; 210/172.3; 210/172.4; 210/455; 210/483; 210/445; 184/6.24

(58) Field of Classification Search .................. None
See application file for complete search history.

(56) References Cited

U.S. PATENT DOCUMENTS

| | | | | |
|---|---|---|---|---|
| 1,568,796 A | * | 1/1926 | Breer | 210/130 |
| 1,671,391 A | * | 5/1928 | Winslow et al. | 184/106 |
| 1,773,134 A | * | 8/1930 | Fisher | 210/167.02 |
| 1,800,585 A | * | 4/1931 | Woolson | 210/167.02 |
| 1,874,585 A | * | 8/1932 | Newcomb | 184/106 |
| 2,339,303 A | * | 1/1944 | Tillery | 220/564 |
| 2,539,820 A | * | 1/1951 | Duchesneau | 210/136 |
| 2,577,188 A | * | 12/1951 | Hall | 184/106 |
| 3,014,592 A | * | 12/1961 | Stephens | 210/167.08 |
| 3,020,950 A | * | 2/1962 | Schraivogel | 137/549 |
| 3,056,501 A | * | 10/1962 | Thorman et al. | 210/132 |

(Continued)

FOREIGN PATENT DOCUMENTS

DE    3123269 C2    6/1982

(Continued)

OTHER PUBLICATIONS

United States Patent & Trademark Office Class 210 Schedule—Class 210 Liquid Purification or Separation, Oct. 2006, 14 Pages.*

(Continued)

*Primary Examiner* — Robert James Popovics
(74) *Attorney, Agent, or Firm* — Kramer & Amado P.C.

(57) ABSTRACT

The invention relates to an oil filter apparatus comprising an oil inlet and an oil outlet, with a suction oil pump being connectable to the oil outlet with which a negative pressure can be produced between the oil inlet (and the oil outlet, a coarse filter medium and a fine filter medium which is arranged between the oil inlet and the oil outlet, with the oil filter apparatus being capable of allowing a volume share of the oil to pass permanently through the coarse filter medium irrespective of the viscosity of an oil passing through the oil inlet and of allowing at the same time the remaining volume share of the oil to pass through the fine filter medium. The entire oil volume flow can thus be purified in a short period of time with high efficiency, and no additional space is required outside of the transmission or engine, a light and cost-effective configuration is achieved, and the oil filter apparatus can be used in different vehicle models or types of engines without any change and thus without any reduction in the variety of variants.

5 Claims, 1 Drawing Sheet

U.S. PATENT DOCUMENTS

| | | | |
|---|---|---|---|
| 3,061,104 A * | 10/1962 | Schaffner | 210/172.3 |
| 3,121,473 A * | 2/1964 | Blystone | 184/109 |
| 3,168,468 A * | 2/1965 | Jagdmann | 210/167.08 |
| 3,295,297 A * | 1/1967 | Collins | 96/155 |
| 3,480,149 A * | 11/1969 | Houser | 210/445 |
| 3,662,887 A * | 5/1972 | Uhlhorn, Jr. | 210/131 |
| 3,784,011 A * | 1/1974 | Ward | 210/167.03 |
| 3,803,810 A * | 4/1974 | Rosenberg | 96/6 |
| 3,994,812 A * | 11/1976 | Nilsson | 210/172.2 |
| 4,129,503 A * | 12/1978 | Joseph | 210/232 |
| 4,136,011 A * | 1/1979 | Joseph et al. | 210/167.08 |
| 4,250,039 A * | 2/1981 | Cozzi et al. | 210/416.5 |
| 4,264,443 A * | 4/1981 | Anderson et al. | 210/167.08 |
| 4,352,737 A * | 10/1982 | Taniguchi | 210/455 |
| 4,387,023 A * | 6/1983 | Napier | 210/167.08 |
| 4,402,827 A * | 9/1983 | Joseph | 210/314 |
| 4,450,081 A * | 5/1984 | Anderson et al. | 210/445 |
| 4,600,511 A * | 7/1986 | Sherman et al. | 210/316 |
| 4,604,200 A * | 8/1986 | Machart, Jr. | 210/314 |
| 4,666,594 A * | 5/1987 | Schneider | 210/167.08 |
| 4,683,850 A * | 8/1987 | Bauder | 123/195 C |
| 4,826,598 A * | 5/1989 | Cain | 210/445 |
| 4,828,694 A * | 5/1989 | Leason | 210/167.08 |
| 4,874,510 A * | 10/1989 | Akira et al. | 210/172.4 |
| 4,889,621 A * | 12/1989 | Yamada et al. | 210/167.08 |
| 4,966,522 A * | 10/1990 | Koyama | 415/121.2 |
| 4,995,971 A * | 2/1991 | Droste et al. | 210/167.03 |
| 5,049,267 A * | 9/1991 | Sasaki et al. | 210/172.3 |
| 5,049,274 A * | 9/1991 | Leason et al. | 210/445 |
| 5,494,575 A * | 2/1996 | Kitajima et al. | 210/167.04 |
| 5,538,633 A * | 7/1996 | Kitajima et al. | 210/445 |
| 5,607,578 A * | 3/1997 | Ohkouchi et al. | 210/172.4 |
| 5,728,292 A * | 3/1998 | Hashimoto et al. | 210/136 |
| 5,817,236 A * | 10/1998 | Chiba | 210/344 |
| 5,853,577 A * | 12/1998 | Gizowski et al. | 210/167.08 |
| 5,863,424 A * | 1/1999 | Lee | 210/167.02 |
| 5,928,507 A * | 7/1999 | Chiga | 210/172.4 |
| 6,013,179 A * | 1/2000 | Laughlin et al. | 210/172.1 |
| D420,682 S * | 2/2000 | Werner | D15/5 |
| 6,058,898 A * | 5/2000 | Freese, V | 123/195 C |
| 6,143,169 A * | 11/2000 | Lee | 210/167.02 |
| 6,165,373 A * | 12/2000 | Agner | 210/767 |
| 6,183,632 B1 * | 2/2001 | Covington | 210/167.02 |
| 6,187,185 B1 * | 2/2001 | Lee | 210/167.02 |
| 6,190,546 B1 * | 2/2001 | Agner | 210/167.08 |
| 6,193,833 B1 * | 2/2001 | Gizowski et al. | 156/272.8 |
| 6,217,758 B1 * | 4/2001 | Lee | 210/167.06 |
| 6,220,454 B1 * | 4/2001 | Chilton | 210/483 |
| 6,290,843 B1 * | 9/2001 | Lee et al. | 210/167.08 |
| 6,294,083 B1 * | 9/2001 | Lee et al. | 210/130 |
| D457,893 S * | 5/2002 | Caldwell | D15/5 |
| 6,428,699 B1 * | 8/2002 | Iwata et al. | 210/249 |
| 6,432,307 B2 * | 8/2002 | Gizowski et al. | 210/321.6 |
| D463,803 S * | 10/2002 | Wolford | D15/5 |
| D464,062 S * | 10/2002 | Wolford | D15/5 |
| 6,464,863 B1 * | 10/2002 | Nguyen | 210/167.03 |
| 6,488,844 B2 * | 12/2002 | Willis et al. | 210/172.2 |
| 6,523,561 B2 * | 2/2003 | Kapcoe et al. | 137/15.01 |
| D472,247 S * | 3/2003 | Beer et al. | D15/5 |
| 6,582,593 B2 * | 6/2003 | Wolford et al. | 210/130 |
| 6,585,889 B2 * | 7/2003 | Weingaertner | 210/172.2 |
| 6,616,836 B1 * | 9/2003 | Covington | 210/167.02 |
| 6,638,423 B2 * | 10/2003 | Dockery | 210/132 |
| 6,648,146 B2 * | 11/2003 | Beer et al. | 210/405 |
| 6,715,459 B2 * | 4/2004 | Rosendahl et al. | 123/195 C |
| D491,194 S * | 6/2004 | Wolford et al. | D15/5 |
| D496,669 S * | 9/2004 | Wolford et al. | D15/5 |
| 6,793,812 B2 * | 9/2004 | Caldwell et al. | 210/167.04 |
| 6,827,848 B2 * | 12/2004 | Covington | 210/167.02 |
| 6,835,306 B2 * | 12/2004 | Caldwell | 210/167.04 |
| 6,849,179 B1 * | 2/2005 | Taylor et al. | 210/223 |
| 6,972,085 B2 * | 12/2005 | Wolford et al. | 210/130 |
| 7,056,432 B2 * | 6/2006 | Smith | 210/132 |
| 7,087,160 B2 * | 8/2006 | Beer et al. | 210/167.02 |
| 7,128,218 B2 * | 10/2006 | Rosendahl et al. | 210/455 |
| 7,134,568 B2 * | 11/2006 | Moriyama et al. | 220/563 |
| 7,182,869 B2 * | 2/2007 | Catlin et al. | 210/416.4 |
| 7,217,357 B2 * | 5/2007 | Rosendahl et al. | 210/130 |
| 7,258,789 B2 * | 8/2007 | Peet et al. | 210/232 |
| 7,261,814 B2 * | 8/2007 | Peet et al. | 210/232 |
| 7,281,904 B2 * | 10/2007 | Schultz et al. | 417/79 |
| 7,282,140 B2 * | 10/2007 | Boast et al. | 210/130 |
| 7,294,263 B2 * | 11/2007 | Johnson et al. | 210/232 |
| 7,331,771 B2 * | 2/2008 | Schultz et al. | 417/313 |
| 7,357,865 B1 | 4/2008 | Nadar | |
| D570,950 S * | 6/2008 | Khalil | D23/209 |
| 7,383,809 B2 * | 6/2008 | Rosendahl et al. | 123/198 E |
| 7,387,190 B2 * | 6/2008 | Lochocki, Jr. | 184/106 |
| 7,407,057 B2 * | 8/2008 | Vichinsky et al. | 210/437 |
| 7,429,322 B2 * | 9/2008 | Fujita et al. | 210/172.4 |
| 7,444,729 B2 * | 11/2008 | Lochocki | 29/407.01 |
| 7,478,729 B2 * | 1/2009 | Sato et al. | 210/491 |
| 7,510,087 B2 * | 3/2009 | Morikawa et al. | 210/445 |
| 7,767,084 B2 * | 8/2010 | Jinbo et al. | 210/232 |
| 7,845,500 B2 * | 12/2010 | Hueppchen et al. | 210/455 |
| 7,901,572 B2 * | 3/2011 | Sato | 210/172.4 |
| 2002/0011435 A1 | 1/2002 | Koltunov | |
| 2002/0095763 A1 * | 7/2002 | Willis et al. | 29/453 |
| 2002/0096221 A1 * | 7/2002 | Kapcoe et al. | 137/590 |
| 2002/0121473 A1 * | 9/2002 | Boast et al. | 210/450 |
| 2002/0179507 A1 * | 12/2002 | Wolford et al. | 210/130 |
| 2003/0006179 A1 * | 1/2003 | Caldwell | 210/168 |
| 2003/0010692 A1 * | 1/2003 | Sato et al. | 210/172 |
| 2003/0042185 A1 * | 3/2003 | Dockery | 210/132 |
| 2003/0132147 A1 * | 7/2003 | Rosendahl et al. | 210/130 |
| 2003/0132157 A1 * | 7/2003 | Beer et al. | 210/435 |
| 2003/0140887 A1 * | 7/2003 | Rosendahl et al. | 123/195 C |
| 2003/0155287 A1 * | 8/2003 | Osborn | 210/172 |
| 2003/0201216 A1 * | 10/2003 | Wolford et al. | 210/130 |
| 2004/0007520 A1 * | 1/2004 | Rosendahl et al. | 210/435 |
| 2004/0026306 A1 * | 2/2004 | Covington | 210/172 |
| 2004/0144705 A1 * | 7/2004 | Yamada et al. | 210/172 |
| 2004/0144716 A1 * | 7/2004 | Kobayashi et al. | 210/508 |
| 2004/0164009 A1 * | 8/2004 | Smith | 210/132 |
| 2004/0237485 A1 * | 12/2004 | Beer et al. | 55/379 |
| 2004/0251194 A1 * | 12/2004 | Brzozowski et al. | 210/416.4 |
| 2005/0023201 A1 * | 2/2005 | Sato | 210/172 |
| 2005/0045566 A1 * | 3/2005 | Larkin et al. | 210/767 |
| 2005/0087481 A1 * | 4/2005 | Boast et al. | 210/130 |
| 2005/0098508 A1 * | 5/2005 | Caldwell | 210/805 |
| 2005/0109685 A1 * | 5/2005 | Fujita et al. | 210/172 |
| 2005/0133421 A1 * | 6/2005 | Peet et al. | 210/168 |
| 2005/0133428 A1 * | 6/2005 | Peet et al. | 210/232 |
| 2005/0139534 A1 * | 6/2005 | Peet et al. | 210/168 |
| 2005/0139541 A1 * | 6/2005 | Peet et al. | 210/436 |
| 2005/0150826 A1 * | 7/2005 | Sato et al. | 210/488 |
| 2005/0230323 A1 * | 10/2005 | Peet et al. | 210/767 |
| 2005/0230324 A1 * | 10/2005 | Peet et al. | 210/767 |
| 2006/0016740 A1 * | 1/2006 | Schultz et al. | 210/130 |
| 2006/0016741 A1 * | 1/2006 | Moriyama et al. | 210/172 |
| 2006/0169632 A1 * | 8/2006 | Suzuki et al. | 210/493.1 |
| 2006/0175239 A1 * | 8/2006 | Johnson et al. | 210/232 |
| 2006/0180535 A1 * | 8/2006 | Yu et al. | 210/172 |
| 2006/0180541 A1 * | 8/2006 | Hueppchen et al. | 210/450 |
| 2006/0207928 A1 * | 9/2006 | Morikawa et al. | 210/435 |
| 2006/0219620 A1 * | 10/2006 | Suga | 210/232 |
| 2006/0219624 A1 * | 10/2006 | Kuno | 210/435 |
| 2006/0231482 A1 * | 10/2006 | Khalil et al. | 210/473 |
| 2006/0254974 A1 * | 11/2006 | Khalil et al. | 210/420 |
| 2007/0000832 A1 * | 1/2007 | Vichinsky et al. | 210/435 |
| 2007/0017745 A1 * | 1/2007 | Rosendahl et al. | 184/6.24 |
| 2007/0023337 A1 * | 2/2007 | Peet et al. | 210/136 |
| 2007/0151906 A1 * | 7/2007 | Beer et al. | 210/130 |
| 2008/0169235 A1 * | 7/2008 | Goto | 210/454 |
| 2008/0290013 A1 * | 11/2008 | Stausberg et al. | 210/167.04 |
| 2009/0050551 A1 * | 2/2009 | Kimisawa et al. | 210/172.4 |
| 2009/0114578 A1 * | 5/2009 | Pekarsky et al. | 210/123 |
| 2009/0120858 A1 * | 5/2009 | Kojima et al. | 210/167.08 |
| 2009/0127174 A1 * | 5/2009 | Shinbori et al. | 210/167.08 |
| 2009/0134088 A1 * | 5/2009 | Morishita et al. | 210/451 |
| 2009/0139922 A1 * | 6/2009 | Poskie et al. | 210/167.08 |
| 2009/0230049 A1 * | 9/2009 | Stausberg et al. | 210/416.5 |
| 2009/0250410 A1 * | 10/2009 | Khalil et al. | 210/767 |
| 2009/0294343 A1 * | 12/2009 | Pekarsky et al. | 210/167.08 |
| 2009/0301954 A1 * | 12/2009 | Beer et al. | 210/167.08 |
| 2010/0038296 A1 * | 2/2010 | Beer et al. | 210/167.03 |
| 2010/0072120 A1 * | 3/2010 | Sato | 210/172.4 |

FOREIGN PATENT DOCUMENTS

| | | |
|---|---|---|
| DE | 10240666 A1 | 3/2004 |
| EP | 1733755 A | 12/2006 |
| EP | 1733775 A1 | 12/2006 |
| JP | 4636341 | 12/1971 |
| JP | 50150963 | 12/1975 |
| JP | 61111513 | 7/1986 |
| JP | 63141619 | 9/1988 |
| JP | 218959 | 2/1990 |
| JP | 7256016 | 10/1995 |
| JP | 2006316902 A | 11/2006 |
| KR | 1020040033274 | 4/2004 |
| WO | WO 2005014141 A1 * | 2/2005 |
| WO | WO 2007129514 A1 * | 11/2007 |

OTHER PUBLICATIONS

United States Patent & Trademark Office Class 210 Definitions—Class 210 Liquid Purification or Separation, Oct. 2006, 129 Pages.*

* cited by examiner

OIL FILTER APPARATUS

CROSS-REFERENCE TO RELATED APPLICATIONS

This application claims priority of German Patent Application No. 102007023641.9 filed May 22, 2007, the entire disclosure of which is incorporated herein by reference.

FIELD OF THE INVENTION

The invention relates to an oil filter apparatus for filtering oil in engines and transmissions and an oil pan with such an oil filter apparatus.

BACKGROUND OF THE INVENTION

In order to filter oil in engines and transmissions, a suction oil filter apparatus or a pressure oil filter apparatus can be used. In the case of a suction oil filter apparatus, a pump is arranged at the oil outlet of the apparatus, with the pump sucking the oil to be filtered through a filter medium by means of negative pressure. When seen in the direction of flow, the pump of the filter apparatus is thus downstream. It is common practice to arrange a suction oil filter apparatus directly in an oil sump of an oil pan, with the entire oil to be filtered flowing through said suction oil filter apparatus. Such a construction requires only little additional space and is thus compact and does not require any additional connecting lines. When designing such an apparatus, there will always be a balance between the maximum permitted differential pressure between oil inlet and oil outlet of the apparatus and a filtering performance resulting therefrom. Since a minimum oil volume flow needs to pass through the suction oil filter even in the case of high viscosity of the oil or at low temperature of the oil in order to thus achieve sufficient lubrication of an engine or a transmission, only a relatively low filtering performance is achieved. A suction filter apparatus can thus be evaluated in a simplified manner as a coarse filter.

In the case of a pressure oil filter apparatus, the oil to be filtered is pressed by means of a pump into a filter apparatus. Such an apparatus is usually arranged in a bypass and can be activated by means of a valve for example. A pressure oil filter apparatus is often arranged within the transmission or on the transmission housing, with hose connections or pipe connections being required outside of the transmission. In comparison with a suction oil filter apparatus such a construction requires a relatively large amount of space, with the weight and the costs of a transmission or engine increasing substantially by the connecting lines. Since only a part of the oil volume flow to be filtered, which is mostly less than 50%, flows through such a pressure oil filter apparatus, a highly efficient filter medium in pleated form for example can be used. A relatively high amount of soiling with dirt is linked to such a high filter performance, so that a filter medium of a pressure oil filter apparatus needs to be exchanged relatively frequently. The pressure oil filter apparatus can be destroyed in the case of excessive oil pressure, so that overpressure protection needs to be integrated in the pressure oil filter circulation by means of a bypass valve for example or an orifice plate.

In order to achieve the highest possible oil purity within a short period of time, a combination of suction oil filter apparatus through which passes the entire oil volume flow and a pressure oil filter apparatus through which passes only a bypass flow of 20 to 40% of the entire oil volume flow can be provided. The disadvantageous aspect is the constructional and instrumental complexity of peripheral parts such as adapters, housing, oil guidance, etc. for the pressure oil filter apparatus, including the required additional space. As a result of the high pressure load, a highly stable and heavy construction of the apparatus is required. The costs for such a combination of suction oil filter apparatus and pressure oil filter apparatus are thus relatively high.

SUMMARY OF THE INVENTION

It is the object of the invention to provide an oil filter apparatus and a oil pan with such an oil filter apparatus with which the entire oil volume flow can be purified with high efficiency within a short period of time, without requiring any additional space outside of the transmission or engine, but by achieving a light and cost-effective configuration and by using the oil filter apparatus in different vehicle models and types of engines without any change and thus without any reduction in the range of variants.

This object is achieved by the features of the independent claims. Advantageous embodiments of the invention are shown in the sub-claims.

The oil filter apparatus in accordance with the invention comprises an oil inlet and an oil outlet, with a suction oil pump being connectable to the oil outlet with which a negative pressure can be produced between the oil inlet and the oil outlet, with the oil filter apparatus additionally comprising a coarse filter medium and a fine filter medium which is arranged between the oil inlet and the oil outlet. The oil filter apparatus in accordance with the invention is arranged in such a way that it is capable of allowing a volume share of the oil to pass permanently through the coarse filter medium irrespective of the viscosity of an oil passing through the oil inlet and of allowing at the same time the remaining volume share of the oil to pass through the fine filter medium.

As a result of this arrangement of the oil filter apparatus in accordance with the invention as a suction oil filter apparatus, a complete throughput of the oil volume flow to be filtered is achieved. A high filtration performance can be achieved in addition, such that not the entire oil volume flow is conveyed through a coarse filter medium, but partly also through a fine filter medium. This occurs independent of the viscosity of the oil to be filtered, so that no valves, orifice plates or similar actuating members need to be switched or controlled. The expense for a pressure oil filter apparatus is no longer required, so that a light and cost-effective configuration is achieved.

According to one embodiment of the oil filter apparatus in accordance with the invention, the fine filter medium is arranged in the direction of flow before the coarse filter medium. As a result, a high differential pressure is transferred via the low flow resistance of the coarse filter medium to the fine filter medium and increases the oil volume flow passing through the fine filter medium. When the fine filter medium is provided with at least one permanent opening through which the oil can pass in an unfiltered manner, an inhomogeneous flow through the coarse filter medium can thus be achieved. A main flow can be achieved through skilful positioning and/or through a suitable number of the permanent opening(s) in the fine filter medium with which the coarse filter medium is not loaded homogeneously in a planar way. In the case of high viscosity of the oil (cold starting), a sufficiently open filtration surface is available, so that the permissible differential pressure is not exceeded.

The oil filter apparatus in accordance with the invention can be dimensioned in accordance with a further embodiment in such a way that in the case of high viscosity of the oil the volume share of the oil passing through the at least one permanent opening of the fine filter medium to the coarse filter medium is approximately 90 to 95% of the entire oil volume flow passing through the oil filter apparatus. The advantage of a suction oil filter apparatus as a coarse filter is thus maintained. This function also maintained when the fine filter medium is fully loaded without generating a significant rise of the differential pressure of the entire suction filter apparatus. This is especially advantageous because in the case of a separate pressure oil filter an additional bypass valve would be opened in high viscosity of the oil as a result of the employed fine filter medium, so that unfiltered oil would enter the oil circulation.

The share of the oil passing through the fine filter medium can increase continually in the oil filter apparatus in accordance with the invention with increasing reduction of the viscosity of the oil during the operation of an engine or transmission, thus achieving an increasing cleansing of the oil. The oil filter apparatus can be dimensioned in such a way that during low viscosity of the oil the volume share of the oil passing through the coarse filter medium is at most 50% of the entire oil volume flow passing through the oil filter apparatus. This means that a share of at least 50% of the entire oil volume flow is guided through the fine filter medium, with the same subsequently passing through the coarse filter medium.

In order to achieve a high filtering performance, the fine filter medium is preferably a glass-fiber mat, a plastic mat, a cellulose mat or a fine-wire fabric. The coarse medium is preferably a metal fabric or a plastic fabric.

The oil filter apparatus in accordance with the invention comprises a top filter shell and a bottom filter shell, with the top filter shell comprising at least one spacer towards the coarse filter medium. The coarse filter medium can thus be positioned with a high amount of precision in the filter cavity. It the same way, the bottom filter shell is provided with at least one spacer. The spacer can concern a support rib which reduces the deformation of the top and bottom filter shells and thus a reduction in the inner space of the filter. In addition, the spacer can also be arranged as a spacer bead, so that a predetermined distance between the bottom filter shell and towards the fine filter medium is achieved. A certain undercurrent beneath the fine filter medium can thus be achieved. It can thus also be prevented that the fine filter medium will stick to a smooth and plane surface of the bottom shell and impair the function of the oil filter apparatus.

At least one spacer is provided between the coarse filter medium and the fine filter medium in accordance with a further embodiment. Said spacer can be arranged as a support grating, with said support grating contributing to the transfer of the forces originating from the suction pressure onto the bottom filter shell in order to keep a deformation of the bottom filter shell as low as possible. Preferably, such a spacer comprises glass-fiber-reinforced plastic, especially PA66GF30-35, or metal wire fabric or extruded plastic fabric.

The oil filter apparatus in accordance with the invention is preferably arranged in such a way that a ratio of the heights of the top filter shell to a spacer between the coarse filter medium and the fine filter medium to the bottom filter shell is approximately equal to 42:38:20. A high filtering efficiency can be achieved with a low accumulation of air. Moreover, an accumulation of air in the filter apparatus can be avoided in such a way that the shape of the filter is adjusted towards the oil outlet.

If a free end or the free ends of a spacer are provided with a radius, it is ensured that the filter media are not damaged. The size of the radius depends on the forces in the oil volume flow forming by the intake pressure and a deformation of a filter medium under such a load. The top filter shell and the bottom filter shell and the spacers are dimensioned in such a way that a deformation of all components is kept as low as possible, so that the oil flow spaces decrease even under extreme conditions by less than 7%.

In a further embodiment of the oil filter apparatus, the top filter shell comprises plastic and the bottom filter shell comprise metal or the like. This ensures that the filter shell comprising the metal can be arranged with a low wall thickness in order to thus save overall space and achieve a maximum cavity volume of the filter. Such a filter shell preferably has a simple filter shape. In the case of a complex shape of a filter shell it is advantageous when the shell comprises plastic. Connecting shapes to the pump and receiving a packing ring and flow ribs in the cavity of the oil filter apparatus can thus be created for example for a top filter shell in a simple manner by primary shaping or reshaping. When a plastic top filter shell is used, it can preferably comprise PA66GF30-35.

In the oil filter apparatus in accordance with the invention, a hydraulic cross section of the oil inlet is larger by a factor of 1.5 than a hydraulic cross section of the oil outlet, so that the flow losses in the interior of the filter can be kept at a relatively low level.

The object is further achieved by an oil pan with an oil filter apparatus as described above.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The invention is now explained in closer detail by reference to an embodiment shown in the drawings, wherein.

DETAILED DESCRIPTION OF THE DRAWINGS

Figure 1:
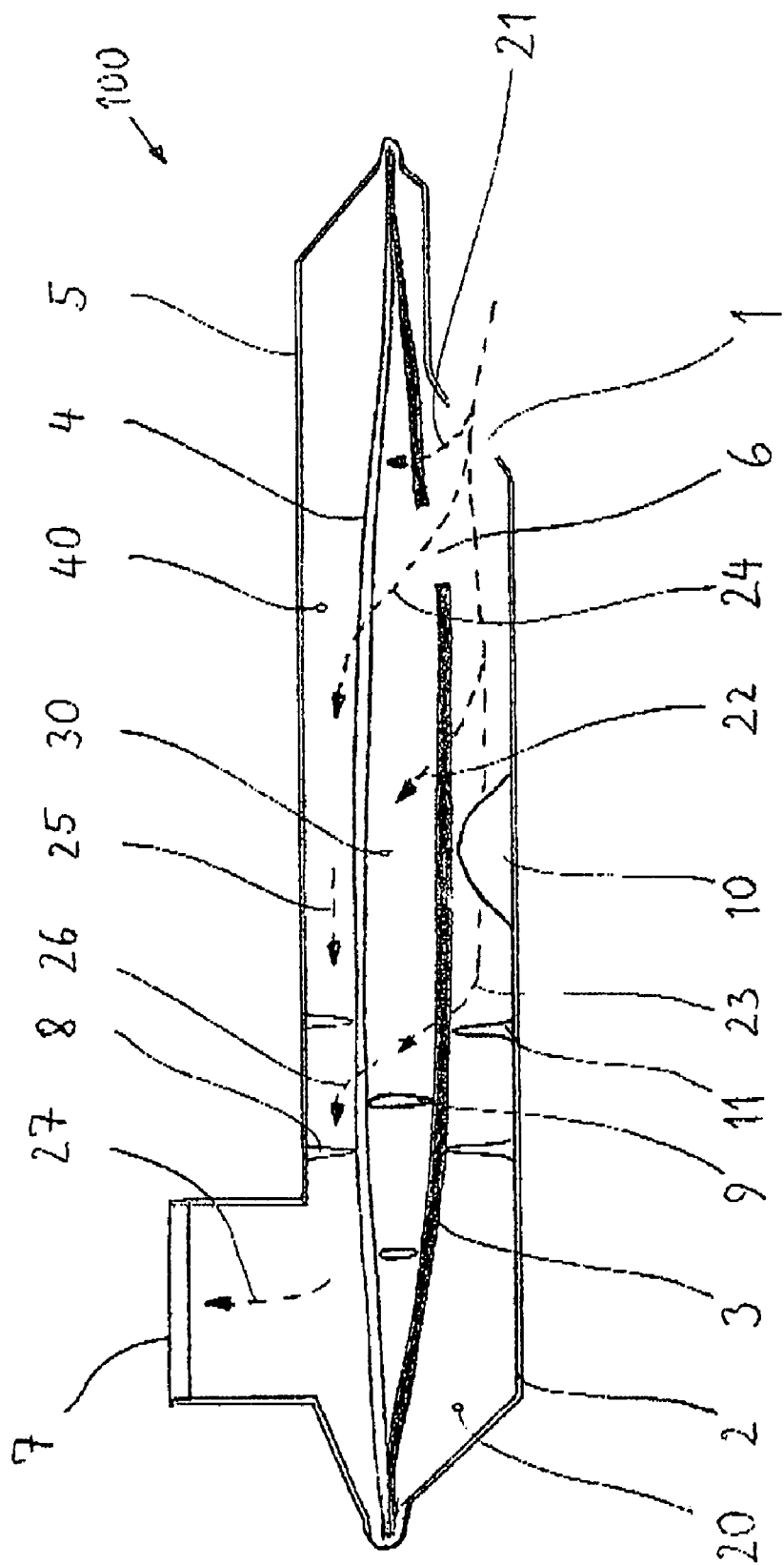
FIG. 1 shows a schematic representation of an embodiment of an oil filter apparatus in accordance with the invention.

FIG. 1 shows a longitudinal sectional view of an embodiment of the oil filter apparatus 100 in accordance with the invention. The apparatus comprises an oil inlet 1 and an oil outlet 7. A suction pump can be connected to the latter. The oil inlet is provided on one side in a bottom filter shell 2, with the oil outlet 7 being arranged on an opposite side at the highest possible distance from oil inlet 1 in a top filter shell 5. Oil to be filtered enters the filter cavity 20 of the bottom filter shell 2 through the oil inlet 1 as a result of a negative pressure produced by the suction oil pump. The oil meets the fine filter medium 3 (see arrows 21, 22 and 23) and flows through said fine filter medium 3. In the embodiment as shown in FIG. 1, said filter medium 3 comprises a permanent opening 6 through which the oil penetrating the filter apparatus 100 can pass through the fine filter medium 3 without filtering and reaches an intermediate space 30 between fine filter medium 3 and a coarse filter medium 4 arranged behind the same in the direction of flow. As a result of the negative pressure which is also present in the intermediate space 30, said share of the oil volume flow passes the coarse filter medium 4 and reaches the filter cavity 40 which is situated in the direction of flow behind the coarse filter 4. The oil flows from there (see arrows 25 and 27) in the direction towards the oil outlet 7 and the suction oil pump (not shown in FIG. 1). The share of the oil volume flow which passes through the fine filter medium 3 (see arrows 21, 22 and 23) then passes through the coarse filter medium 4 (see arrow 26) and also reaches the oil outlet 7 (see arrow 27).

In the case of high viscosity of the oil, a large portion of the oil to be filtered flows through the permanent opening 6 of the fine filter medium and is exclusively filtered by the coarse filter medium 4. The fine filter medium 3 is not capable as a result of the high flow resistance to allow the highly viscous oil to flow through the same. With increasing temperature and thus decreasing viscosity of the oil, an increasingly larger share of the oil entering through oil inlet 1 can pass through the fine filter medium 3, so that the filtration effect of the oil filter apparatus increases continually. This continual improvement of the oil purity is achieved without any actuation of actuators such as valves, flaps or orifice plates. There can thus not be any blocking or imprecise displacement of mechanical components, so that a highly secure and self-regulating system for oil purification is achieved. The simultaneous passage of oil through the fine filter medium 3 and the coarse filter medium 4 thus always allows for an optimal purification of oil in the shortest possible time, with the surface share of the fine filter medium 3 and thus the share of the oil volume flow through the fine filter medium 3 increasing with decreasing viscosity. It has been observed in cases of very low viscosity of the oil that a favourable filtration is already achieved when the volume share of the filtered oil passing through the fine filter medium 3 is at least 50% of the entire oil volume flow passing through the oil filter apparatus.

An increase in the filter efficiency is achieved when in the embodiment as shown in FIG. 1 spacer beads 11 are provided on the bottom filter shell 2. They allow an undercurrent of the fine filter medium 3 and prevent the fine filter medium 3 from adhering to the inner side of the bottom filter shell 2. A deformation of the bottom filter shell 2 can be achieved by a support rib 10. Spacer ribs 8 ensure a predetermined distance between the inside of the top filter shell 5 and the coarse filter medium 4 in a similar manner to the spacer beads 11. A further improvement of the filtering performance can be achieved by a support grating 9 between the fine filter medium 3 and the coarse filter medium 4.

The number and shape of the permanent opening(s) 6 in the fine filter medium 3 are especially important for the filtering performance. When several openings are provided, they can be distributed in even or uneven distances with respect to each other in the fine filter medium 3. This depends on a predetermined absolute flow rate, a predetermined flow rate in relation to the temperature and a predetermined filtering efficiency. Further parameters for improving the oil purity are the height of the bottom shell 2 and the top shell 5, the height ratio between said two filter shells 2 and 5, the height position of the fine filter medium 3 and coarse filter medium 4 within the filter apparatus and thus the volume shares of the cavities 20, 30 and 40, as well as the material and configuration of the filter media 3 and 4. Similarly, the position and the hydraulic cross section of oil inlet 1 is of relevance for the filtering performance in order to ensure that when oil enters the filter apparatus 100 no air is drawn in. The spacers 8, 9, 10 and 11 also determine through their shape, number and position within the filter apparatus and their position with regard to each other and with respect to the shape and position of the permanent opening(s) the efficiency of the oil filter apparatus in accordance with the invention. The optimal adjustment of said parameters is made by simulation and trials. The oil filter apparatus in accordance with the invention allows for cost savings of at least 80% in comparison with a conventional suction filter apparatus which is combined with a pressure filter apparatus. The reduction in weight is more than 50% because the pressure oil filter apparatus with housing and peripheral components are no longer required, with all functionally relevant features of a separate suction oil filter apparatus and a separate pressure oil filter apparatus being achieved in the oil filter apparatus in accordance with the invention.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

The invention claimed is:

1. An oil filter apparatus for filtering oil comprising:
   a housing defining an interior chamber, an upper portion, a lower portion, an inlet on the lower portion, and an outlet on the upper portion;
   a fine filter media spanning across the chamber, and having at least one permanent opening defined therethrough so that through the permanent opening the oil can pass in a manner unfiltered by the fine filter media;
   a coarse filter media spanning across the chamber and being contiguous with no opening therethrough, wherein the fine filter media is located towards the inlet side of the housing, relative to the coarse filter media being towards the outlet side of the housing, wherein both the fine and coarse filter media are each in the form of a substantially flat sheet; and
   an intermediate spacer element located in between the coarse filter media and the coarse filter media, and spacing apart a majority of the fine filter media from the coarse filter media, wherein filtration of oil is achieved without any actuation of actuators including valves, flaps or orifice plates.

2. A filter apparatus according to claim 1, further comprising:
   a lower spacer disposed on the lower portion of the housing to hold the fine filter media spaced apart from the lower portion of the housing; and
   an upper spacer disposed on the upper portion of the housing to hold the coarse filter media spaced apart from the upper portion of the housing.

3. An oil filter apparatus according to claim 1, wherein the fine filter medium comprises at least one of a glass fiber mat, a plastic mat, a cellulose mat, or a fine-wire fabric.

4. A filter apparatus according to claim 1, wherein the coarse filter medium is at least one of a metal fabric or a plastic fabric.

5. A filter apparatus according to claim 1, wherein the upper portion comprises a top filter shell or a top housing shell, and the lower portion comprises a bottom housing shell, and the top filter shell is at least partially made of plastic and the bottom housing shell is at least partially made of metal.

* * * * *